Figure 1:
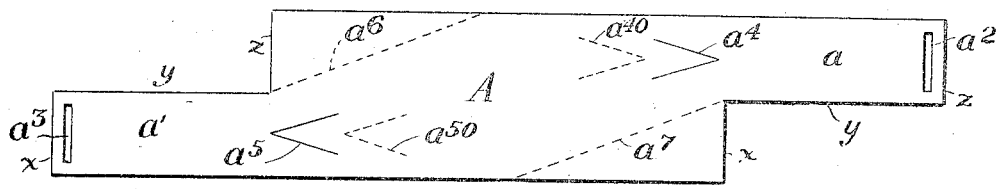

T. J. BAUGH.
CABLE CLIP.
APPLICATION FILED JULY 16, 1909.

957,300.

Patented May 10, 1910.

WITNESSES
H. Löwenstein
James H. Marr

INVENTOR
Thomas Jefferson Baugh
by
Attorney

UNITED STATES PATENT OFFICE.

THOMAS JEFFERSON BAUGH, OF HOPKINSVILLE, KENTUCKY.

CABLE-CLIP.

957,300.

Specification of Letters Patent.

Patented May 10, 1910.

Application filed July 16, 1909. Serial No. 508,039.

*To all whom it may concern:*

Be it known that I, THOMAS JEFFERSON BAUGH, a citizen of the United States, residing at Hopkinsville, in the county of Christian and State of Kentucky, have invented certain new and useful Improvements in Cable-Clips, of which the following is a specification, reference being had therein to the accompanying drawing.

My invention relates to supporting means for electrical cables, and has for its object the production of an improved clip or band for attaching a cable to a messenger wire or other support.

According to standard practice, where lead covered cables containing conductors of small size are not laid in conduits (where of course they would be supported throughout their entire length), they are attached at short intervals to some supporting means such as a messenger wire or cable having sufficient tensile strength to carry the weight of lead cables as well as its own under all conditions of temperature and weather. Attachment has heretofore been made by means of wrappings or twine, bands or tape, or metal clips, but none of these have proved entirely satisfactory in actual use for several reasons. The first two deteriorate very rapidly, and unless they are frequently repaired or replaced, the cable will sag at intervals thereby causing elbows to form in the cable which favor crystallization of the lead cable sheath, thereby causing it to crack or break as the nodal lines of vibration are passing over these places. Also they do not bond or ground the cable so as to eliminate electrolysis, which frequently sets up in a two way conductor of this class thereby destroying the lead cable. The metal clips on the other hand which do not bind or connect the cable to the messenger in as close, neat, and snug a manner as mine do, are subject to vibration causing crystallization due to movement of the atmosphere, jarring and swaying of poles, as they are being climbed by trouble men, or being hit by vehicles passing by, and many other similar things; and if insulated, the cable is additionally exposed to damage from electrolysis due to stray currents.

My present invention obviates all the foregoing objections, and in addition is very inexpensive and easy to manufacture. It can be adjusted to the messenger and locked in place more quickly than the average cable clip heretofore on the market, it supports the cable in a proper manner to eliminate vibration, it maintains a good ground connection at each point of support for the sheath, so as to prevent electrolytic action, and has other advantages which will sufficiently appear from the description hereinafter.

This clip consists essentially of a blank stamped out of sheet metal with staggered extensions upon its two ends, a tongue formed in the body of the blank at the root of each extension, and a slot to receive the tongue near the end of its extension.

In use the body is bent around the cable sheath, the two extensions are passed around the messenger wire from opposite sides and each is brought back on its own side and clamped by the tongue on the body passing through its slot.

My invention is illustrated in the accompanying drawing in which—

Figure 2:
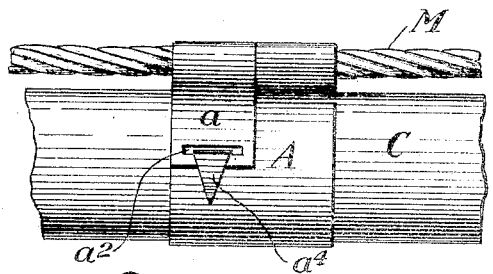
Figure 3:
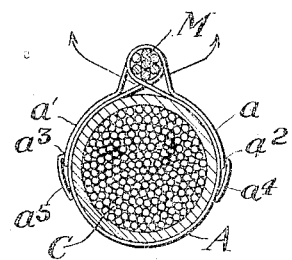
Figure 4:
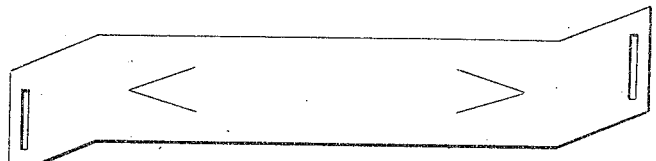
Figure 5:
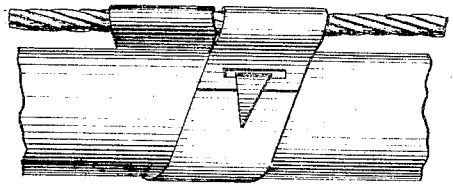

Figure 1 is a plan view of the blank unbent. Fig. 2 is a side view of the clip in position on a cable. Fig. 3 is an end view thereof with the cable in section. Figs. 4 and 5 show a modification, in which the blank is practically a plain band.

Referring to the drawings A is the body, with the two staggered extensions $a$ and $a'$ upon its opposite ends. It should be particularly observed that the shape of the body lends itself to economy in material, because the metal may be first cut in strips or ribbons and then simply cut off in lengths by dies shaped to follow the lines $x$ $y$ $z$, which recur again and again. Each extension has a slot formed with its end as shown at $a^2$ and $a^3$, and corresponding to each slot a tongue is formed in the body, pointing outwardly, as shown at $a^4$ and $a^5$ respectively. The one-piece clip thus formed may be of any one of a number of metals, such as zinc, sheet iron, or copper. Ordinary commercial tin plate, or a combination of such metals, including lead, iron sheeting covered with tin is suitable, in some ways the best for the purpose.

The width of the body should be sufficient to afford an extended support, which will not concentrate vibrations upon any particular point. In practice I prefer a width of not less than one inch for the smaller cables and ranging from one inch to three inches in width according to the size cable and weight it has to carry, while the length is of course variable according to the size of cable to be supported. It is possible to make the same size clip serve for several sizes of cable however, by providing more than one tongue for each extension band as indicated in dotted lines at $a^{40}$ and $a^{50}$.

To adjust this clip in position, the body A is bent around the sheath of the cable C (see Figs. 2 and 3) and the two extension bands $a$ and $a'$ are carried beneath the messenger from opposite sides as indicated by the arrows in Fig. 3. Both ends are then bent up over the messenger and returned on themselves until their slots $a^2$, $a^3$ reach the tongues $a^4$, $a^5$ over which they are pressed and the tongues drawn back so as to lock them in position. With the weight of the cable C upon the messenger M and the clip in addition, an extended contact is produced between the body A and the sheath of the cable C, and also between each extension arm $a$ and $a'$ and the messenger. As the clips are applied at intervals of less than one foot between centers, there is thus provided a practically continuous ground connection for the entire sheath, while the extent of the surfaces in contact not only eliminates any resistance, but also any chance of crystallization.

I am aware that changes may be made in non-essentials, without departing from the characteristic features of my invention. It is to be understood that I contemplate all such changes and wish to include them within the scope of my claims. As an example, I may point out that instead of the angular outline due to the staggered position of the extensions $a$ and $a'$, I may eliminate the corners at $x$ and $z$, cutting the body along the lines $a^6$ and $a^7$. This would reduce the blank to practically a plain band, as shown in Figs. 4 and 5, and of course to fit the cable and messenger snugly, it would conform to the angle such as would be required to lay in proper lines and directions as per figure, but as the surface contact would be less, I consider the first form preferable. The transmission of strains from one extension to the other is practically the same in both cases.

Having thus described my invention, what I claim and desire to secure by Letters Patent—

1. A cable support comprising a messenger wire, and a one piece cable clip comprising a wide body and oppositely offset extensions at opposite ends thereof, with slots in the extensions and tongues formed on the body at the base of each extension, said body adapted to closely embrace a cable sheath, throughout substantially the entire circumference of the latter with the extensions crossing each other between the messenger wire and the cable, then passing up over the messenger wire, crossing each other above the same and returning in the opposite directions so that their respective tongues will engage in their slots, all substantially as described.

2. A cable support comprising a messenger wire and a one piece cable clip having a broad body closely embracing the cable sheath, with its ends crossed above the same and beneath the messenger wire, and then looped around the latter in opposite directions and the ends secured to the body, whereby extended support is provided for the cable.

3. A cable support comprising a messenger wire and a one piece cable clip having a broad body and extension ends crossed first beneath and then above the messenger wire, and terminally secured to opposite sides of the body whereby extended support of the cable sheath is secured, and vibration and crystallization prevented.

4. A one-piece cable clip having a broad body adapted to surround and effect extended surface contact with a cable sheath, a pair of extension bands or arms on opposite ends of said body adapted to pass under and be returned upon themselves over a supporting device, and means to secure the same to the body when so returned, substantially as described.

5. A cable clip or band comprising a rectangular body A having extension arms $a$, $a'$ formed with terminal slots $a^2$, $a^3$ and oppositely pointed tongues $a^4$, $a^5$ formed in the body to engage said slots, substantially as described.

6. A cable clip or band comprising a body formed with opposite extensions of substantially equal length and having terminal slots fitted to receive tongues formed in the body, the proportions and arrangements of the parts being such that the body is adapted to engage around the sheath of a cable and the extensions to pass oppositely around the messenger wire, returning in opposite directions therefrom to engage said tongues, substantially as described.

7. A cable clip comprising a body with reduced complementary terminal extensions adapted to engage a messenger wire and when returned upon themselves to receive holding means on the body through their slots, forming a close and extended contact with the cable sheath and messenger wire, and thereby preventing vibration and crystallization, substantially as described.

In testimony whereof I affix my signature in presence of two witnesses.

THOMAS JEFFERSON BAUGH.

Witnesses:
 FRANK G. HOGE,
 D. G. EDWARDS.